United States Patent Office 3,465,918
Patented Sept. 9, 1969

3,465,918
DISPENSING VALVE
Milo Edward Webster, Braintree, Mass., assignor to The Gillette Company, Boston, Mass., a corporation of Delaware
Filed Dec. 7, 1967, Ser. No. 688,751
Int. Cl. B67d 5/56; F16k 11/04, 19/00
U.S. Cl. 222—136                22 Claims

ABSTRACT OF THE DISCLOSURE

A pressure delivery device has inner and outer compartments, each storing a separate ingredient. A valve assembly includes a mixing chamber having an outlet passage, an inlet passage from the outer compartment of 0.017 inch inner diameter and an inlet passage from the inner compartment of 0.030 inch inner diameter. A nylon valve plug in the mixing chamber is biased by a compression spring to normally seal both inlet passages. An actuator stem is slidably received in a coaxial bore of the valve plug and extends through outlet passage. The stem has a bore which defines a discharge passage and ports in its walls are moved into communication with the mixing chamber when the stem is depressed. A leaf spring having a convex central portion and two concave end portions is disposed in the mixing chamber below the valve plug. When the stem is depressed, it flexes the leaf spring and the end portions of that spring lift the plug to open the inlet passages so that the two ingredients flow into the chamber for mixing and then are dispensed through the discharge passage.

This invention relates to pressure delivery devices and to valve assemblies useful in such devices.

Conventional pressure delivery devices consist, typically, of a single substance in a container under the pressure of an enclosed non-reactant gas and means for opening the vessel to the atmosphere, such that the substance to be delivered is forced out the opening by the pressure of enclosed gas. Where the substance is non-corrosive of the surrounding container and is a stable mixture, such a device is satisfactory.

Often, however, it is desired to deliver a mixture which is relatively unstable, i.e., not capable of being maintained, without separation irreversible on shaking or without decomposition, in a mixed form in a sealed container for commercially acceptable period of time. For such mixtures, it is necessary to provide a pressurized container having several compartments, typically a series of containers, separated by collapsible or selectively permeable (by the non-reactant gas) walls, each of which will dispense one ingredient of the mixture into the delivery structure, which delivers the desired mixture.

It is an object of this invention to provide a novel and improved valve assembly particularly adapted for use in a pressure delivery device capable of delivering a mixture of two or more separately maintained ingredients.

It is another object to provide a pressurized spraying device which enables complete and efficient mixing of precisely controlled amounts of accurately dispensed ingredients, for rapid and efficient delivery from a device employing conventional containers, all in an easily assembled, durable, and economical system.

In general the invention features a pressurized container for delivering a mixture of ingredients stored in separate compartments, wherein a valve structure includes a valve with a plurality of sealing surfaces each adapted to block a corresponding ingredient passage, biasing structure normally urges the valve to seal the ingredient passages, and an actuating assembly includes a pressure responsive rigid member, a resilient member having a first deformable portion and a second portion, and a guide arranged so that upon deformation of the first portion the second portion operably bears against the valve in an unsealing direction, the rigid member being operable upon application of external pressure to cause deformation of the first portion of the resilient member. In preferred embodiments the ingredient passages are unsealed simultaneously; the rigid member is a generally cylindrical stem slidable in a cylindrical recess of the valve, the stem includes an inner bore communicating with a discharge passage and radial ports communicating with the bore to provide communication with a mixing chamber only when the valve is in position to allow the ingredient passages to communicate with the mixing chamber; a cylindrical gasket with a concentric circular aperture receives the stem, the gasket being located adjacent the mixing chamber to seal the stem ports therefrom, the stem ports being moved out of sealing contact with the gasket upon movement of the stem to unseal the valve; the resilient actuating member is a sheet-like integral spring with a convex central portion sloping into concave outer portions which include wings for bearing upon the valve in a unsealing direction upon flattening pressure of the central portion, and the guide includes a longitudinal slot for receiving the spring, the slot having a flat surface large enough to accommodate the spring when uncompressed, and inclined cam surfaces slanting toward the valve, the flat surface being disposed adjacent the valve at a distance substantially equal to the height of the wings when the valve is in a sealing position, whereby compression of the convex portion of the spring causes the wings to travel along the cam surfaces, unsealing the valve; the biasing structure is a spring; the mixing chamber includes a series of concentric annular mixing sections disposed between the ingredient passages and the discharge passage and having gradually decreasing mixing volumes; and the valve is a generally cylindrical plug having a plurality of radially spaced axially extending passages. In another aspect the invention features a valve assembly as described above.

Other objects, features and advantages will appear from the following description of a particular embodiment of the invention, taken together with the attached drawings thereof, in which.

Figure 5:
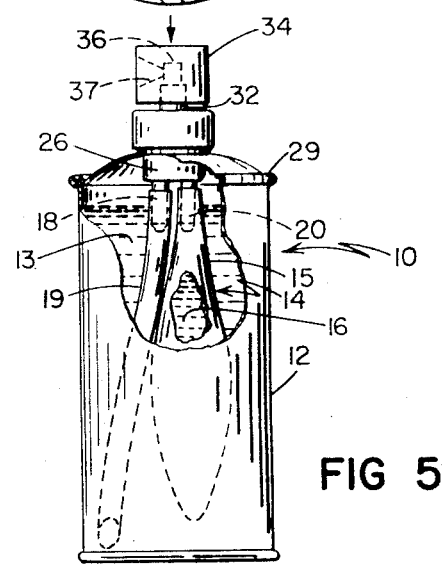
FIGURE 5 is a front view, in partial section, of a pressurized container employing a delivery structure embodying the present invention.

Referring first to FIGURE 5, there is shown a pressurized dispersing device 10 having a rigid substantially cylindrical compartment 12 containing a first ingredient 13, and a second tube-like compartment 14 having pressure deformable walls 15 containing a second ingredient 16. Depending stubs 18, 20 are secured to delivery structure housing 26, stub 18 communicating with compartment 12 through dip tube 19 and stub 20 communicating with compartment 14 through port 22. Cap 29 secures housing 26 to outer compartment 12. Cap 29 also contains an aperture in its upper wall which slidably receives nylon stem 32, on which is received actuator cap 34 for integral movement therewith. Actuator cap 34 also contains a discharge passage 36 which provides communication between inner bore 38 of stem 32 and exit port 37. A suitable non-reactant propellent gas is stored in compartment 12 above ingredient 13.

Figure 1:
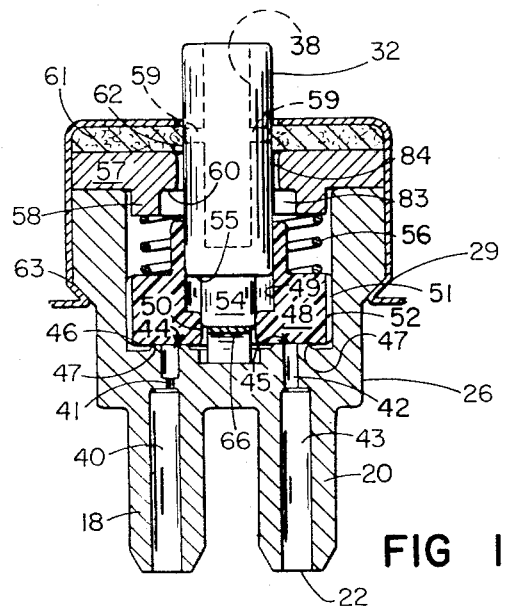
FIGURE 1 is a sectional view of a delivery structure, embodying the present invention, in a closed position.

Referring now to FIGURES 1–4, delivery passage 40 is formed in stub 18 and includes control passage 41 of 0.017 inch inner diameter. Delivery passage 43 is formed in stub 20 and includes control passage 42 of 0.030 inch inner diameter. Control passages 41, 42 communicate through orifices 44, 45 with annular valve chamber 80. Orifices 44, 45 are formed in a plane in the top surfaces of frustoconical projection 47 of delivery tubes 40, 43, and the sealing surface 46 of valve plug 48, when valve plug 48 is in its seated position, as shown in FIG. 1, is in sealing contact with orifices 44, 45.

Nylon valve plug 48 includes a central inner bore 49 of diameter 0.160 inch, a concentric counterbore 50 of diameter 0.100″, a concentric cylindrical body 51 of outer diameter 0.373 inch, and a series of axial passages 52, disposed at 45° intervals about the periphery of said body, each passage being 0.030″ wide and together defining an inner concentric circle of diameter 0.363″. Valve plug 48 has a total height of 0.225 inch; the body 51 being 0.115″ high; and counterbore 50 being 0.064 inch long. Stem 32, inserted in inner bore 49, has a diameter of 0.155 inch and includes a concentric protruding cylindrical head 54 which extends 0.100 inch beyond stem 32 and has a diameter of 0.095 inch. It is adapted to slidably extend through counterbore 50 of valve plug 48. The movement of stem 32 in central inner bore 49 of valve plug 48 is limited by shoulders 55.

Stem 32 also includes opposed ports 59 which communicate (when stem 32 is depressed) with inner bore 38 and with the annular passage 84 formed by shim 57.

Biasing spring 56 is disposed between valve plug 48 and annular concentric shim 57, and continually urges valve plug 48 toward a sealing position. Shim 57 is of medium density polyethylene and has an outer diameter of 0.568 inch, a total height of 0.095 inch, and an innermost diameter of 0.186 inch. It also includes an annular concentric projection 58 having a height of 0.032 inch, an inner diameter of 0.236 inch and an outer diameter of 0.358 inch on which the upper end of spring 56 is seated. Shim 57 has an outer surface parallel with the surface of housing 26 and includes shoulder 60 to limit the movement of valve plug 48.

Gasket 61 is disposed between shim 57 and cap 29 and has a height of 0.045 inch, an outer diameter of 0.560 inch, and an inner concentric annular bore 62 of diameter 0.155 inch, stem 32 slidably extending through the inner bore 62. Cap 29 has a diameter of 0.572 inch opposite gasket 61 and is crimped in at corners 63 to secure housing 26.

Figure 3:
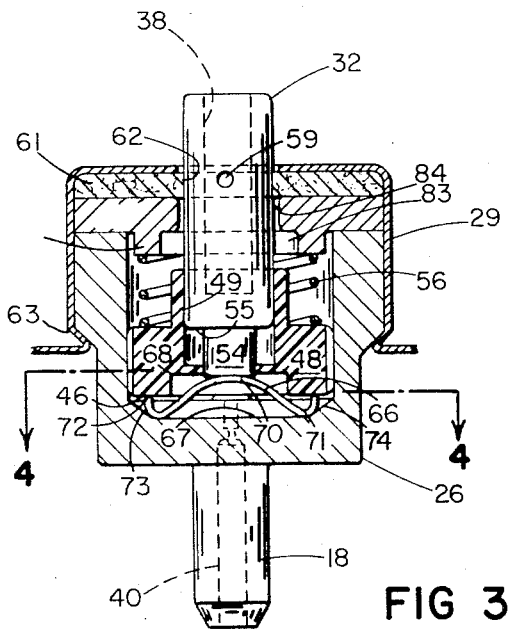
FIGURE 3 is a view of the delivery structure of FIGURE 1, at a right angle to the view taken in FIGURE 1.
Figure 4:
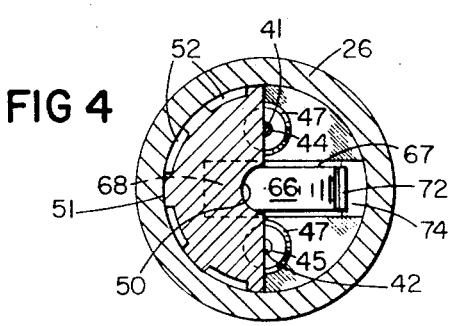
FIGURE 4 is a top sectional view, along lines 4—4 indicated in FIGURE 3.

As shown most clearly in FIGURES 3 and 4, actuating spring 66 rests in longitudinal spring slot 67 and also in generally rectangular slot 68 of valve plug 48, which is cut centrally into the seating surface 46 of valve plug 48. These two channels prevent excessive lateral movement of the spring element 66 at all times, even when compressed. Actuating spring 66 comprises a central convex portion 70 and two concave end portions 71, each ending in a wing 72. Spring channel 67 has tapered cam surfaces 73, 74 up which wings 72 slide when stem head 54 depresses convex spring portion 70, spreading actuating spring 66 and concave portions 71, and, with tapered walls 73, 74, causing movement of wings 72 in an opposite direction to the actuating movement of stem head 54.

Figure 2:
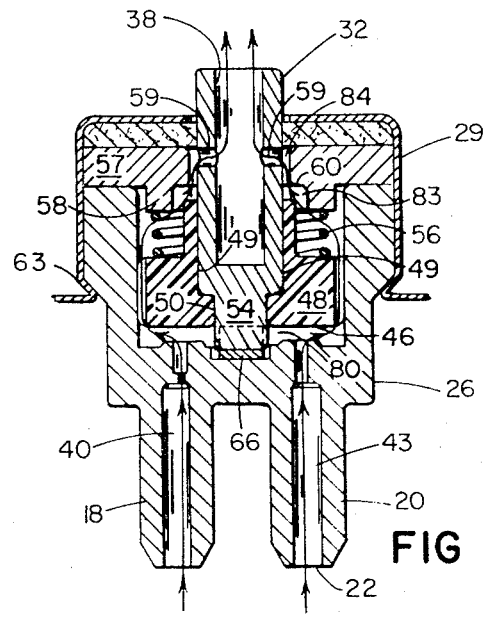
FIGURE 2 is the same view of the structure of FIGURE 1, except in an open position.

In operation, stem 32 is depressed by external pressure on pressure cap 34, along the direction of the arrow in FIG. 5. Depressing stem 32 in FIGURE 1 causes stem head 54 to bear down upon actuating spring 66, depressing convex portion 70, causing wings 72 to creep up cammed surfaces 73, 74 and bear upon the actuating surface 46 of valve plug 48, thus opening passages 41, 42 to valve chamber 80 as shown in FIGURE 2. As indicated by the arrows in FIGURE 2, ingredient 13 thus proceeds, under pressure of propellent gas, up dip tube 19 and delivery passage 40 in tubular stub 18, through control passage 41, into annular valve chamber 80 below valve seating surface 46, and through passages 52 past biasing spring 56, into lower annular shim section 83, and into upper annular shim section 84. Since movement of stem 32 has caused ports 59 to become open to upper shim section 84, material passes through them into discharge passage 36. At the same time, also under pressure of the propellent gas, ingredient 16 is forced through tubular stub 20 and ingredient passage 42, into annular valve chamber 80 below and through slots 52, past biasing spring 56 into lower shim section 83, upper shim section 84, through ports 59 into inner stem bore 38. Although in FIGURE 2 the arrows indicate that ingredients proceed separately until nozzle 34, it will be understood that since all of sections 80, 83, 84 are annular and of relatively small volume, and since the ingredients are forced out of passages 41, 42 under pressure and impinge on surface 46, substantial mixing occurs in these sections prior to bore 38. Additionally, the collision of pressure-fed jet-like streams from opposing slots 59 into stem bore 38 assures complete mixing prior to exit of the mixture through discharge passage 36.

Other embodiments will occur to those skilled in the art and are within the following claims.

What is claimed is:

1. In a pressurized container for delivering a mixture of ingredients comprising a plurality of compartments for separately storing each of said ingredients, a mixing chamber, a plurality of ingredient passages providing communication between said corresponding compartments and said mixing chamber, and a discharge passage for delivering said mixture from said mixing chamber, a valving structure comprising a valve member having a plurality of sealing surfaces, each adapted to block a corresponding ingredient passage and biasing structure normally urging said valve member to seal said ingredient passages, and an actuating assembly comprising:

a pressure responsive rigid member,
a resilient member having a first deformable portion, and a second portion, and
a guide arranged so that upon deformation of said first portion said second portion operably bears against said valve member in an unsealing direction,
said rigid member being operable upon application of external pressure to cause said deformation of said first portion of said resilient member.

2. The structure of claim 1 wherein said actuating assembly urges said valve member to unseal said ingredient passages simultaneously.

3. The apparatus of claim 1 wherein said rigid member comprises a generally cylindrical stem, and said valve member includes a cylindrical recess for slidably securing said stem.

4. The apparatus of claim 3 wherein said resilient actuating member comprises an actuating spring having a first portion lying in the path of travel of said stem and deformable upon application of external pressure through said stem, and a second portion structured, upon deforming of said first portion, to unsealingly bear against said valve member.

5. The apparatus of claim 3 wherein said stem includes an inner bore communicating with said discharge passage, and a plurality of radial ports communicating with said bore, said ports providing communication with said mixing chamber only when said valve member allows said ingredient passages to communicate with said mixing chamber.

6. The apparatus of claim 5 wherein said pressurized container includes a cylindrical gasket member having a concentric circular aperture for slidably receiving said stem and placed adjacent said mixing chamber to seal said stem ports from said mixing chamber, said stem ports moved out of sealing contact with said gasket and into communication with said mixing chamber upon movement of said stem unsealing said valve member.

7. The apparatus of claim 1 wherein said resilient actuating member comprises a sheet-like integral spring member having a convex central portion sloping into concave outer portions, said outer portions comprising wings for bearing upon said valve member in an unsealing direction upon flattening pressure on said convex central portion.

8. The apparatus of claim 7 wherein said valve member includes a cylindrical recess, and a rigid member is provided having a generally cylindrical stem, said stem being slidably movable in said cylindrical recess and having a protruding head for contacting, and applying flattening pressure to, said convex central portion of said spring member.

9. The apparatus of claim 8 wherein all said sealing surfaces of said valve member lie in a single plane perpendicular to the direction of movement of said stem, and said spring member has outer portions disposed closely adjacent said valve member sealing surface.

10. The apparatus of claim 8 wherein said actuating assembly includes a guide structure for maintaining said resilient member in alignment with said protruding stem head.

11. The device of claim 10 wherein said guide structure includes a longitudinal slot for receiving said spring member, said slot having a flat surface large enough to accommodate said spring member when uncompressed, and inclined cam surfaces slanting toward said valve member,
said flat surface disposed adjacent said valve member at a distance substantially equal to the height of said wings when said valve member is in a sealing position, whereby depressing said convex portion of said spring causes said wings to travel along said cam surfaces, unsealing said valve member.

12. The apparatus of claim 1 wherein said biasing structure includes a biasing spring continually urging said valve member in a sealing direction.

13. The apparatus of claim 1 wherein said mixing chamber comprises a series of concentric annular mixing sections disposed between said ingredient passages and said discharge passage and having gradually decreasing mixing volumes.

14. The apparatus of claim 1 wherein said mixing chamber includes a first cylindrical bore for slidably securing said valve member,
and said valve member comprises a generally cylindrical plug having a plurality of radially spaced, axially-extending valve passages, for passing material released at said ingredient passages, upon unsealing of said valve member, to the remainder of said mixing chamber.

15. The assembly of claim 14 further including:
a biasing spring normally urging said valve member to seal said ingredient passages,
and wherein said valve member has a central cylindrical recess and said actuating assembly comprises:
a pressure-responsive stem slidably secured in said cylindrical recess in said valve member,
a sheet-like integral spring member having a convex central portion sloping into concave outer portions, said outer portions adapted to bear upon said valve member in an unsealing direction upon flattening pressure on said convex central portion,
and guide structure for maintaining said spring member in alignment with said stem including a recess large enough to accommodate said spring member when uncompressed, and inclined cam surfaces slanting toward said valve member, whereby depressing said convex portion of said spring causes said outer potrions to travel along said cam surfaces, unsealing said valve member,
said stem having a protruding head portion for contacting and flattening said convex central portion of said spring upon application of external pressure to said stem.

16. The apparatus of claim 15 wherein said stem includes an inner bore communicating with said discharge chamber through a plurality of radial ports continually communicating with said bore, means normally sealing said mixing chamber from said discharge passage, said stem ports being movable into communication with said mixing chamber upon movement of said stem unsealing said valve member.

17. A valve assembly for delivering a mixture of ingredients comprising a mixing chamber having a plurality of ingredient passages providing communication to said mixing chamber, and a dscharge passage for delivering a mixture of ingredients from said mixing chamber,
a valving structure in said mixing chamber comprising a valve member having a plurality of sealing surfaces, each adapted to block a corresponding ingredient passage and biasing structure normally urging said valve member to seal said ingredient passages, and an actuating assemblng comprising:
a pressure responsive rigid member,
a resilient member having a first deformable portion, and a second portion, and
a guide arranged so that upon deformation of said first portion said second portion operably bears against said valve member in an unsealing direction,
said rigid member being operable upon application of external pressure to cause said deformation of said first portion of said resilient member.

18. The assembly of claim 17 wherein said actuating assembly urges said valve member to unseal said ingredient passages simultaneously.

19. The assembly of claim 17 wherein said rigid member comprises a stem slidably secured in said valve member, and said resilient actuating member comprises an actuating spring, the first portion of which lies in the path of travel of said stem.

20. The assembly of claim 19 wherein said stem includes a wall defining an inner passage and a port through said wall,
and further including a gasket member having an aperture for slidably receiving said stem sealing said stem port from said mixing chamber, said stem port being moved out of sealing contact with said gasket and into communication with said mixing chamber upon movement of said stem unsealing said valve member.

21. The assembly of claim 18 further including:
a biasing spring normally urging said valve member to seal said ingredient passages,
and wherein said valve member has a central cylindrical recess and said actuating assembly comprises:
a pressure-responsive stem slidably secured in said cylindrical recess in said valve member,
a sheet-like integral spring member having a convex central portion sloping into concave outer portions, said outer portions adapted to bear upon said valve member in an unsealing direction upon flattening pressure on said convex central portion,
and guide structure for maintaining said spring member in alignment with said stem including a recess large enough to accommodate said spring member when uncompressed, and inclined cam surfaces slanting toward said valve member, whereby depressing said convex portion of said spring causes said outer portions to travel along said cam surfaces, unsealing said valve member, said stem having a protruding head portion for contacting and flattening said convex central portion of said spring upon application of external pressure to said stem.

22. The assembly of claim 21 wherein said stem includes a wall defining an inner passage and a port through said wall, and further including a gasket member having an aperture for slidably receiving said stem sealing said stem port from said mixing chamber, said stem port being moved out of sealing contact with said gasket and into communication with said mixing chamber upon movement of said stem unsealing said valve member.

References Cited

UNITED STATES PATENTS

| 2,973,883 | 3/1961 | Modderno | 222—145 X |
| 3,217,936 | 11/1965 | Abplanalp | 222—145 X |
| 3,236,418 | 2/1966 | Dalle et al. | 222—145 X |
| 3,241,722 | 3/1966 | Nissen | 222—145 X |
| 3,270,920 | 9/1966 | Nesser | 222—94 X |
| 3,323,690 | 6/1967 | Monahon | 222—509 X |

ROBERT E. REEVES, Primary Examiner

H. S. LANE, Assistant Examiner

U.S. Cl. X.R.

137—607; 222—145, 509; 251—321

PO-1050
(5/69)

UNITED STATES PATENT OFFICE
CERTIFICATE OF CORRECTION

Patent No. 3,465,918          Dated September 9, 1969

Inventor(s) Milo E. Webster

It is certified that error appears in the above-identified patent and that said Letters Patent are hereby corrected as shown below:

```
Column 6, line 20, "dscharge" should be --discharge--;
Column 6, line 27, "assemblng" should be --assembly--;
Column 6, line 56, "18" should be --17--.
```

SIGNED AND
SEALED

DEC 23 1969

(SEAL)
Attest:

Edward M. Fletcher, Jr.
Attesting Officer

WILLIAM E. SCHUYLER, JR
Commissioner of Patents